(12) United States Patent
Kyburz et al.

(10) Patent No.: US 12,047,195 B2
(45) Date of Patent: *Jul. 23, 2024

(54) REMOTE ACTIVATION OF THE WIRELESS SERVICE INTERFACE OF A CONTROL DEVICE USING A PERIPHERAL DEVICE

(71) Applicant: Siemens Schweiz AG, Zürich (CH)

(72) Inventors: Beat Kyburz, Ottenbach (CH); Herbert Meier, Baar (CH)

(73) Assignee: SIEMENS SCHWEIZ AG, Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/777,547

(22) PCT Filed: Nov. 18, 2020

(86) PCT No.: PCT/EP2020/082572
§ 371 (c)(1),
(2) Date: May 17, 2022

(87) PCT Pub. No.: WO2021/099410
PCT Pub. Date: May 27, 2021

(65) Prior Publication Data
US 2022/0400027 A1    Dec. 15, 2022

(30) Foreign Application Priority Data
Nov. 19, 2019    (DE) .................... 10 2019 217 772.7

(51) Int. Cl.
*H04L 12/28*    (2006.01)
*F24F 11/56*    (2018.01)
*G05B 19/042*    (2006.01)

(52) U.S. Cl.
CPC ............ *H04L 12/282* (2013.01); *F24F 11/56* (2018.01); *G05B 19/042* (2013.01); *G05B 2219/2614* (2013.01); *H04L 2012/2841* (2013.01)

(58) Field of Classification Search
CPC .... G05B 19/41855; G05B 2219/25399; G05B 2219/25428; H04L 12/66; H04L 67/125; H04L 67/56; H04L 67/62
See application file for complete search history.

(56) References Cited

U.S. PATENT DOCUMENTS 6,330,231 B1 *   12/2001   Bi .................... H04L 69/162
                                                                370/328
11,880,191 B2 *  1/2024    Kyburz ............ G05B 19/41855
(Continued)

FOREIGN PATENT DOCUMENTS

CN           106133800 A      11/2016   ............. G08C 17/02
DE       10 2015 114 442      3/2017    ............. G05B 19/04
(Continued)

OTHER PUBLICATIONS

Search Report for International Application No. PCT/EP2020/082572, 11 pages, Feb. 18, 2021.

*Primary Examiner* — Charles R Kasenge
(74) *Attorney, Agent, or Firm* — Slayden Grubert Beard PLLC

(57) ABSTRACT

One embodiment includes a control device for field devices connected to the control device via a communications network, e.g. a field bus. The control device comprises a wireless service interface (e.g. Wi-Fi interface). The control device is designed to receive a service signal generated by a field device and to activate the wireless service interface in response. Another embodiment includes a method for transmitting data to a control device for controlling field devices connected to the control device via a communications net- (Continued)

work. A wireless service interface of the control device is activated via a service signal generated by a field device and sent to the control device. After the activation of the wireless service interface, data is transferred from a tool (e.g. engineering tool, commissioning tool) via the wireless service interface.

10 Claims, 1 Drawing Sheet

(56) References Cited

U.S. PATENT DOCUMENTS

| | | | | |
|---|---|---|---|---|
| 2011/0245932 | A1* | 10/2011 | Schleiss | H04W 48/08 |
| | | | | 340/815.45 |
| 2014/0071942 | A1* | 3/2014 | Ye | H04W 36/22 |
| | | | | 370/331 |
| 2017/0149581 | A1 | 5/2017 | Reidt | 370/257 |

FOREIGN PATENT DOCUMENTS

| | | | | |
|---|---|---|---|---|
| DE | 10 2016 216 921 | 3/2018 | | H04L 12/24 |
| EP | 3 393 149 | 10/2018 | | H04W 4/02 |
| EP | 3 432 276 | 1/2019 | | G07C 9/00 |
| EP | 3 518 610 | 7/2019 | | H04W 76/10 |

\* cited by examiner

```
wherein a wireless service interface of the control device is activated    VS1
via a service signal generated by a field device and sent to the
control device
```

```
wherein after the activation of the wireless service interface by        VS2
a tool, data is transferred via the wireless service interface
to the control device
```

REMOTE ACTIVATION OF THE WIRELESS SERVICE INTERFACE OF A CONTROL DEVICE USING A PERIPHERAL DEVICE

CROSS-REFERENCE TO RELATED APPLICATIONS

This application is a U.S. National Stage Application of International Application No. PCT/EP2020/082572 filed Nov. 18, 2020, which designates the United States of America, and claims priority to DE Application No. 10 2019 217 772.7 filed Nov. 19, 2019, the contents of which are hereby incorporated by reference in their entirety.

TECHNICAL FIELD

The present disclosure relates to communications networks. Various embodiments include control devices for controlling one or more field devices connected in a data-transmitting manner to the control device via a communications network and/or methods for transmitting data to a control device for controlling one or more field devices connected in a data-transmitting manner to the control device via a communications network.

BACKGROUND

The commissioning of building automation systems for heating, ventilation, air conditioning, etc., requires the loading of large amounts of data (e.g. application software, parameterization data, text libraries, UI graphics for the user interface) to the required control devices (e.g. controllers, automation devices). A firmware update (for bug fixes, security updates or functional extensions) is also often required during commissioning or maintenance of the control devices.

When control devices (e.g. IP-based controllers) for building automation are commissioned, which communicate via an Internet Protocol (e.g. IPv4, IPv6), the IP building network (backbone) is often not ready for operation yet and the efficient loading of larger volumes of data via the backbone is therefore not possible. The loading of larger volumes of data to control devices with a "non-IP building network" (e.g. BACnet MSTP Backbone) is generally very inefficient due to the low transmission capacity and would take far too long for commissioning (e.g. hours for a firmware update).

In principle, larger volumes of data could be efficiently loaded onto the controller (control device) via a local USB interface on the controller. However, the controllers for automation systems are often installed in poorly accessible locations (e.g. in the false ceiling, in window panels or in the false floor) and attaching a USB cable between the tool and controller is tedious and time-consuming. In addition, the length of USB cables is limited to a few meters.

SUMMARY

The teachings of the present invention describe control devices onto which larger volumes of data can be loaded efficiently as well as methods for efficiently loading larger volumes of data onto a control device, in particular for building automation. For example, some embodiments include a control device (SG), in particular for building automation, for controlling one or more field devices (FG1-FG3), which are connected in a data-transmitting manner to the control device (SG) via a communications network (KN), in particular via a field bus, wherein the control device (SG) comprises a wireless service interface (SS), characterized in that the control device (SG) is designed to receive a service signal (SIG) generated by a field device (FG1-FG3) and to activate the wireless service interface (SS) on the basis of the service signal (SIG).

In some embodiments, the control device (SG) is designed to simulate the activation of a service button (ST) located locally on the control device (SG) by means of the service signal received and thereby to activate the wireless service interface (SS).

In some embodiments, after activation of the wireless service interface (SS), the control device (SG) is designed to receive data (FW) and/or transmit data via the wireless service interface (SS).

In some embodiments, the control device (SG) is designed to automatically deactivate the wireless service interface (SS) after receiving or transmitting the data (FW).

In some embodiments, the wireless service interface (SS) is automatically deactivated after a defined period of time if it is not used.

In some embodiments, the service signal (SIG) is a fieldbus-specific message for service and commissioning purposes which was generated by activating a programming button (PT1-PT3) or a service pin (SP1-SP3) on a field device (FG1-FG3).

In some embodiments, the control device (SG) is designed to receive a further service signal (SIG') generated by a field device (FG1-FG3) and to deactivate the wireless service interface (SS) on the basis of the further service signal (SIG').

As another example, some embodiments include a method for transmitting data to a control device (SG), in particular for building automation, for controlling one or more field devices (FG1-FG3) which are connected in a data-transmitting manner to the control device (SG) via a communications network (KN), in particular via a field bus (FG1-FG3), wherein a wireless service interface (SS) of the control device (SG) is activated via a service signal generated by a field device (FG1-FG3) and transmitted to the control device (SG), wherein data is transferred to the control device (SG) via the wireless service interface (SS) after the activation of the wireless service interface by a tool (T).

In some embodiments, activation of a service button (ST) located locally on the control device (SG) is simulated by the service signal (SIG) received from the control device (SG) and thereby the wireless service interface (SS) of the control device (SG) is activated.

In some embodiments, the wireless service interface (SS) is automatically deactivated after the data has been transferred (FW).

In some embodiments, the service signal (SIG, SIG') is a fieldbus-specific message for service and commissioning purposes, which was generated by activating a programming button (PT1-PT3) or a service pin (SP1-SP3) on a field device (FG1-FG3).

In some embodiments, the wireless service interface (SS) of the control device (SG) is deactivated via a further service signal (SIG') generated by a field device (FG1-FG3) and sent to the control device (SG).

BRIEF DESCRIPTION OF THE DRAWINGS

The teachings and advantageous embodiments of the present disclosure are explained in more detail using the following figures as an example. The figures show.

DETAILED DESCRIPTION

Figures 1, 2:
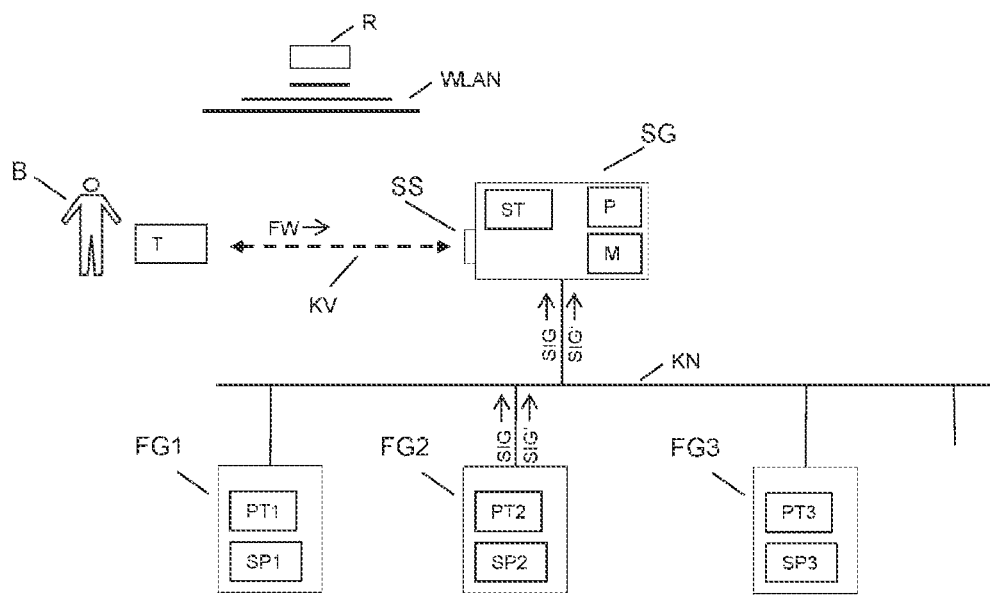
FIG. 1 An exemplary communications network with an exemplary control device and field devices incorporating teachings of the present disclosure.
FIG. 2 An exemplary flow chart for a method for transmitting data to a control device incorporating teachings of the present disclosure.

Various embodiments of the teachings herein include a control device (e.g. controller, automation device), in particular for building automation, for controlling one or more field devices, which are connected in a data-transmitting manner to the control device via a communications network, in particular via a field bus, wherein the control device comprises a wireless service interface (e.g. Wi-Fi interface), wherein the control device is designed to receive a service signal generated by a field device (peripheral device) and to activate (or switch on) the wireless service interface (e.g. Wi-Fi interface) on the basis of the service signal. In building automation, a field device (e.g. actuator or sensor) is assigned to precisely one control device (e.g. controller). This ensures that a service signal generated by a field device is received by the associated control device (i.e. by the controller which controls the field device). As a rule, the field devices have a service pin or a programming button. When the service pin or programming button is activated, the field device generates a field bus-specific message (service signal) for service and commissioning purposes, which is sent to the corresponding controller.

Through this simple and clear remote activation of the local wireless service interface, a service technician or facility manager can very quickly, efficiently and safely identify the correct controller for the room (locate) and start the rapid downloading of the required data to the corresponding controller. The building backbone (i.e. the backbone network in the building, e.g. an IP network) does not have to be operational for this. A time-consuming localization of the controller in poorly accessible locations and the removal of false ceilings, window panels or false floors to attach a USB cable to the controller or to activate the service button on the controller (control device) are no longer necessary. Service calls during operation are significantly simplified and accelerated because the data can be loaded onto the controller (control device) at high speed via the wireless service interface. Commissioning of the controller and service work (e.g. maintenance, installation of patches, firmware updates) are significantly faster and more reliable.

In some embodiments, the control device is designed to receive a service signal generated by a field device and to activate the wireless service interface on the basis of the service signal (if the wireless service interface is switched off) and/or to deactivate the wireless service interface (if the wireless service interface is switched on).

In some embodiments, the control device (controller) is designed to simulate the activation of a service button located locally on the control device by means of the received service signal and thereby to activate the wireless service interface. The controller converts this received service signal by simulating the activation of the local service button on the controller, as if someone had activated the service button locally on the controller.

In some embodiments, after activating the wireless service interface, the control device is designed to receive data and/or to transmit data via the wireless service interface (e.g. radio interface, WLAN, Wi-Fi). Commissioning and service calls during operation are significantly simplified and accelerated because the data can be loaded onto the control device at high speed via the wireless service interface.

In some embodiments, the control device is designed to automatically deactivate the wireless service interface after receiving or sending the data. The automatic deactivation of the wireless service interface by means of a timeout does away with the need for manual deactivation by the service technician (which is often forgotten) after the service work has been completed.

In some embodiments, the wireless service interface is automatically deactivated after a defined period of time if it is not used. The automatic deactivation of the wireless service interface by means of a timeout does away with the need for manual deactivation by the service technician (which is often forgotten) after the service work has been completed.

In some embodiments, the service signal is a fieldbus-specific message for service and commissioning purposes, which was generated by activating a programming button or a service pin on a field device. Typically, field devices have a service pin or a programming button. When the service pin or programming button is activated, the field device generates a fieldbus-specific message for service and commissioning purposes, which is sent to the controller.

In some embodiments, the control device is designed to receive a service signal generated by a field device and to deactivate the wireless service interface (SS) on the basis of the service signal.

Some embodiments include a method for transmitting data to a control device (e.g. controller, automation device), in particular for building automation, for controlling one or more field devices, which are connected in a data-transmitting manner to the control device via a communications network, in particular via a field bus, wherein a wireless service interface (e.g. Wi-Fi interface) of the control device is activated via a service signal generated by a field device and sent to the control device, wherein, after activation of the wireless service interface by a tool (e.g. engineering tool, commissioning tool), data is transferred to the control device via the wireless service interface (e.g. WLAN, Wi-Fi). The method is easy to implement with infrastructure that already exists in any case.

In some embodiments, the service signal received from the control device simulates the activation of a service button located locally on the control device, thereby activating the wireless service interface of the control device. The control device (e.g. controller, PLC, SPS) is designed to convert this received service signal in such a way that activating the local service button is simulated on the controller, as if someone had activated the service button locally on the controller.

In some embodiments, after the data has been transferred, the wireless service interface is automatically deactivated. As a result of the automatic deactivation of the wireless service interface by means of timeout, manual deactivation by the service technician (which is often forgotten) after the service work has been completed is no longer necessary.

In some embodiments, the wireless service interface is automatically deactivated after a defined period of time if it is not used. By automatically deactivating the wireless service interface by means of timeout, manual deactivation by the service technician (which is often forgotten) after the service work has been completed is no longer necessary.

In some embodiments, the service signal is a fieldbus-specific message for service and commissioning purposes, which was generated by activating a programming button or a service pin on a field device. Typically, the field devices have a service pin or a programming button. When the service pin or programming button is activated, the field device generates a fieldbus-specific message for service and commissioning purposes, which is sent to the controller. The programming button or the service pin on the field device can be activated, for example, by a service technician.

In some embodiments, the wireless service interface of the control device is deactivated via the service signal generated by a field device and sent to the control device. The Wi-Fi interface of the control device (e.g. controller) can thus not only be switched on via field bus, but also switched off manually using another command.

Some embodiments include an arrangement designed for carrying out one or more of the methods described herein. The arrangement comprises the control device (controller) according to the invention, correspondingly designed components (field devices, tools, etc.) and correspondingly suitable communication links (e.g. WLAN, field bus).

FIG. 1 shows an exemplary communications network KN with an exemplary control device SG and field devices FG1-FG3 incorporating teachings of the present disclosure. The exemplary control device SG can be, for example, an appropriately designed controller or an automation device for building automation, for example, for the control or regulation of HVAC functionality (heating, ventilation, air conditioning) in a building. The communications network KN may be a field bus or an installation bus (e.g. KNX bus system). The field devices FG1-FG3 are, for example, actuators (e.g. drives for awnings or blinds, dimmers, temperature displays, alarm indicators, etc.) or sensors (e.g. temperature sensors, temperature probes, motion detectors, presence detectors, dim buttons, etc.).

The exemplary control device SG according to FIG. 1 is designed for the control of one or more field devices FG1-FG3, wherein the field devices FG1-FG3 are connected in a data-transmitting manner to the control device SG via a communications network KN (e.g. field bus or installation bus). The control device SG comprises a wireless service interface SS (e.g. radio interface, Wi-Fi interface), the control device SG being designed to receive a service signal SIG generated by a field device FG1-FG3 and to activate the wireless service interface SS on the basis of the service signal SIG.

Each of the field devices FG1-FG3 comprises a corresponding programming button PT1-PT3 and/or a corresponding service pin SP1-SP3. When the service pin SP1-SP3 is activated, or when the respective programming button PT1-PT3 is activated, the respective field device FG1-FG3 generates a fieldbus-specific message SIG for service and commissioning purposes, which is sent to the control device SG (controller).

In the illustration according to FIG. 1, the fieldbus-specific message, i.e. the service signal SIG, is generated, for example, by an operator B (e.g. service technician) activating the programming button PT2 on the field device FG2. The service signal SIG is transmitted to the control device SG via the communications network KN (e.g. building installation bus). The control device SG is designed to receive and accordingly evaluate a service signal SIG. The control device SG comprises a processor P for executing program instructions (in particular software (e.g. applications) or firmware FW). Furthermore, the control device SG comprises one or more storage media M (e.g. main memory or flash memory) for acceptance of application software, firmware FW or an operating system.

Nowadays, controller or control devices SG are increasingly equipped with a local wireless service interface SS (e.g. Wi-Fi, Bluetooth). The wireless service interface SS must be manually activated by the technician for service purposes and automatically switches itself off again after a timeout, so that the wireless service interface SS is permanently deactivated during normal operation (e.g. due to specifications of the building IT administration; as an IT security protection measure; or because of lower power consumption as a result of the radio module in the controller SG being switched off during normal operation).

Hitherto, the wireless service interface SS was activated via a local service button ST on the control device SG (controller). Due to poorly accessible mounting locations of the control device SG, the activation of this service button ST to activate the wireless service interface SS by an operator B is in turn tedious and time-consuming (e.g. dismantle the panel, open the ceiling). The control device SG is therefore designed to simulate the activation of a service button ST located locally on the control device SG by means of the received service signal SIG and thereby to activate the wireless service interface SS. The wireless service interface SS is, for example, a radio interface (e.g. Wi-Fi interface).

After activation of the wireless service interface SS, the control device SG is designed to receive data (e.g. firmware FW and/or application programs) and/or to send data via the wireless service interface SS. In the illustration according to FIG. 1, the control device SG is located in the WLAN network of an exemplary router R after activation of the wireless service interface SS. After activation of the wireless service interface SS, an operator B (e.g. commissioning engineer or service technician) can load firmware FW or a firmware update onto the control device SG via a tool T (e.g. mobile communication terminal, smartphone, tablet computer, PC). The communication link KV between the tool T (e.g. engineering tool or commissioning tool) and the control device SG is established by means of the WLAN network of the router S.

The control device SG may be designed to automatically deactivate the wireless service interface SS after receiving or sending the data FW. Data can be, for example, user data, parameters, configurations, application software, and/or firmware FW. The wireless service interface SS may be automatically deactivated after a defined period of time if it is not used.

The service signal SIG may be a fieldbus-specific message for service and commissioning purposes, which was generated by activating a respective programming button PT1-PT3 or a service pin SP1-SP3 on the respective field device FG1-FG3.

In some embodiments, via the service signal SIG generated by a field device FG1-FG3 and sent to the control device SG, the wireless service interface of the control device is deactivated. The Wi-Fi interface of the control device (e.g. controller) can thus not only be switched on via field bus, but also switched off manually using another command.

In some embodiments, the control device SG is designed to receive a service signal SIG' generated by a field device FG1-FG3 and to deactivate the wireless service interface SS on the basis of the service signal SIG'.

FIG. 2 shows an exemplary flow chart for a method for transferring data (e.g. firmware, firmware update) to a control device (e.g. controller, automation device), in particular for building automation, for controlling one or more field devices which are connected in a data-transmitting manner to the control device via a communications network, in particular via a field bus (e.g. building installation bus, KNX bus), (VS1) wherein a wireless service interface of the control device is activated via a service signal generated by a field device (e.g. actuator or sensor) and sent to the control device, and (VS2) wherein after the activation of the wireless service interface by a tool (e.g. engineering tool or commissioning tool), data (e.g. firmware) is transferred via the wireless service interface (e.g. radio interface, Wi-Fi, WLAN) to the control device. The tool can be implemented, for example, on a mobile communication terminal, smartphone, tablet computer, PC.

In some embodiments, the service signal received by the control device simulates the activation of a service button located locally on the control device and thereby activates the wireless service interface of the control device. In some embodiments, the wireless service interface is automatically deactivated after the data has been transferred.

In some embodiments, the wireless service interface of the control device is deactivated via the service signal SIG generated by a field device FG1-FG3 and sent to the control device SG. The Wi-Fi interface of the control device (e.g. controller) can thus not only be switched on via field bus, but also switched off manually using another command. In some embodiments, the respective service signal SIG is a fieldbus-specific message for service and commissioning purposes, which was generated by activating a programming button or a service pin on a field device.

The methods can be implemented with infrastructure (e.g. WLAN router) which is usually already present in a building.

Exemplary Scenario for Use of the Methods:

a) Each controller (control device) controls one or more field devices via a field bus (e.g. KNX bus, Modbus, LON), which are easily accessible in the room—e.g. room control device, valve drive.

b) These field devices are directly connected to the controller (control device) via the corresponding field bus and available.

c) Generally, only one controller (control device) is connected to the field bus. Therefore, the assignment between the field device and the controller is unique.

d) Typically, the field devices have a service pin or a programming button. When the service pin or programming button is activated, the field device generates a fieldbus-specific message for service and commissioning purposes, which is sent to the controller (control device).

e) This identification message from the field device is received by the controller (control device). The controller (control device) converts this signal by simulating the activation of the local service button locally on the controller (control device), as if someone had activated the service button on the controller (control device).

f) The wireless service interface on the controller (control device) is thus switched on for a specific time.

g) The controller (control device) can be easily identified on the tool (mobile phone, tablet, PC) by detecting the wireless network (e.g. a new Wi-Fi SSID).

h) After connecting the tool (e.g. engineering tool, commissioning tool) to the wireless service interface, larger volumes of data can be loaded onto the controller (control device) very easily and quickly (e.g. for a firmware update).

i) In some embodiments, the activated wireless service interface switches off automatically when not in use (after a timeout).

j) After a reboot of the controller (control device), the wireless service interface is no longer switched on (e.g. reboot after successful FW download).

Exemplary advantages of various embodiments of the teachings of the present disclosure:

By simply and clearly activating the local wireless service interface remotely, the service technician can very quickly, efficiently and securely identify (locate) the correct controller for the room and immediately start downloading the required data rapidly. The building backbone does not have to be operational for this purpose.

The time-consuming localization of the controller in poorly accessible locations and the removal of false ceilings, window panels or false floors to attach a USB tool cable or to activate the service button is no longer necessary.

Service deployments during operation are significantly simplified and accelerated because the data can be loaded at high speed via the wireless service interface.

Due to the automatic deactivation of the wireless service interface by means of timeout, manual deactivation by the service technician (which is often forgotten) after completion of the service work is no longer necessary The implementation of the commissioning and service work is significantly faster and more reliable.

REFERENCE CHARACTERS

SG Control device
ST Service button
SS Service interface
P Processor
M Memory
R Router
WLAN Wireless network
KV Communication link
KN Communications network
FG1-FG3 Field device
PT1-PT3 Programming button
SP1-SP3 Service pin
SIG, SIG' Service signal
T Tool
B User
FW Firmware
VS1, VS2 Step

What is claimed is:

1. A control device for controlling one or more field devices connected in a data-transmitting manner to the control device via a fieldbus, the control device comprising:
a wireless service interface;
wherein the control device is configured to receive a service signal generated by one of the one or more field devices and to activate the wireless service interface in reaction to the service signal;
wherein the service signal comprises a fieldbus-specific message for service and commissioning purposes generated by activating a physical programming button or a physical service pin on the one of the one or more field devices; and
wherein the control device is further configured to deactivate the wireless service interface upon completion of the service and commissioning purposes.

2. The control device as claimed in claim 1, wherein activating the wireless service interface includes simulating the activation of a service button located on the control device.

3. The control device as claimed in claim 1, wherein after activation of the wireless service interface, the control device receives data and/or transmits data via the wireless service interface.

4. The control device as claimed in claim 3, wherein the control device automatically deactivates the wireless service interface after receiving or transmitting the data.

5. The control device as claimed in claim 1, wherein the control device automatically deactivates the wireless service interface after a defined period of time has elapsed following use of the interface.

6. The control device as claimed in claim 1, wherein the control device receives a further service signal generated by a field device and, in response, deactivates the wireless service interface.

7. A method for transmitting data to a control device for controlling one or more field devices connected in a data-transmitting manner to the control device via a fieldbus, the method comprising:

activating a wireless service interface of the control device in response to a service signal generated by one of the one or more field devices and transmitted to the control device; and transferring data to the control device via the wireless service interface after the activation of the wireless service interface by a tool;

wherein the service signal comprises a fieldbus-specific message for service and commissioning purposes generated by activating a physical programming button or a physical service pin on the one of the one or more field devices; and deactivating the wireless service interface upon completion of the service and commissioning purposes.

8. The method as claimed in claim 7, wherein activating the wireless service interface includes simulating activation of a service button located on the control device by the service signal received from the control device.

9. The method as claimed in claim 7, further comprising automatically deactivating the wireless service interface after the data has been transferred.

10. The method as claimed in claim 7, further comprising deactivating the wireless service interface of the control device in response to a further service signal generated by a field device and sent to the control device.

* * * * *